April 9, 1940.  R. A. SHERMAN  2,196,904

DEVICE FOR TESTING VISUAL ACUITY

Filed Dec. 4, 1935

Russel A. Sherman INVENTOR.

ATTORNEYS.

Patented Apr. 9, 1940

2,196,904

UNITED STATES PATENT OFFICE 2,196,904

DEVICE FOR TESTING VISUAL ACUITY

Reuel A. Sherman, Meadville, Pa., assignor to Keystone View Company, Meadville, Pa., a corporation of Pennsylvania Application December 4, 1935, Serial No. 52,797

5 Claims. (Cl. 88—20)

This invention is directed to improvements in devices for testing visual acuity. The usual apparatus employed for this purpose has targets positioned at 20 feet from the person being tested, the targets having groups of characters of different sizes so that the person treated may be tested as to his capacity to correctly distinguish the characters of the different size groups. The person's acuity is given a rating corresponding to a relative value given to the smallest size of symbol that can be correctly distinguished and designated by the person. It is common in such tests to present the targets to both eyes and to each eye individually, the opthalmologist recording the results and prescribing correction in accordance with these tests.

With the present method and devices, stereoscopic views are provided on which targets are formed, photographically graduated as to size, to provide conditions corresponding to targets actually placed at the definite distance usually used for test purposes. In this way it is possible to provide an apparatus and method which may be used under varying conditions, under some of which it would be impossible to use ordinary apparatus and, further, it is possible to perform tests impossible with the ordinary apparatus. Features and details of the invention will more fully appear in the following specification and claims:

A preferred form of the devices exemplifying the invention is illustrated in the accompanying drawing as follows.

I marks the stereoscopic views or slides, these having the usual right and left companion fields 2 and 3. In both fields there are similar targets 4. These are varied in size by placing a series of the targets at predetermined distances from the camera, when the views are taken, so as to give a definite predetermined relation to the sizes of the targets. In the actual views as ordinarily made, the ninth target in the series, starting with the largest target, is of the size that should be readable by a person of normal acuity. In practice it is made 1/40th of the actual size of the target commonly used at 20 feet from the point of observation. Preferably the various targets are photographically arranged so as to give related sizes corresponding to the related sizes of the characters for the different groups now ordinarily used by ophthalmologists with targets placed at the usual 20 foot distance, so that visual acuity of a person being tested may be checked against the ordinary tests or records made with targets and characters of definite spacing and sizes as commonly used.

Figure 1:
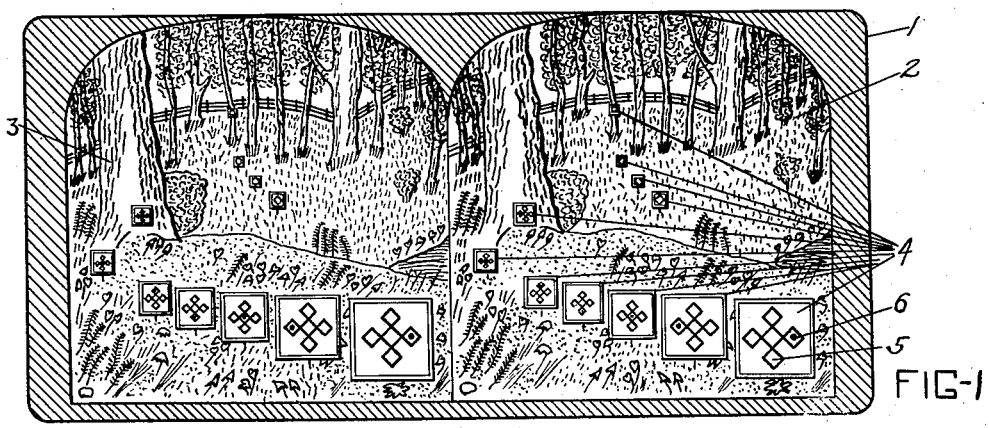
Fig. 1 shows a stereoscopic view having fields in accordance with the invention.

In order that the person being tested may be checked as to the possibility of distinguishing characters or symbols of different sizes, each target is provided with segregated areas. As shown in the views presented, a series of squares 5 are similarly arranged in each target. The preferred arrangement of these squares provides a center square, a square at the top, a square at the bottom, and a square at each side of the center square. A dot 6 is placed in the center of one square in each target. As shown in Fig. 1, corresponding targets in the two fields have the same arrangement of dots 6, thus in the largest target the square at the right in both fields is provided with the dot 6. In the second target, the square at the left in both fields is provided with a dot. In the third target, the center square is provided with a dot in both fields, and this shifting of the dot to different squares, as the targets recede or become smaller in size, is carried out. As these views are presented to the person, he is asked to locate the dot in each target and this is carried forward to the smallest target in which he can correctly distinguish the square in which the dot is placed. In observing the view in Fig. 1, the person views the slide and sees the views in normal manner of observing such a view utilizing both eyes, and his capacity for correctly or incorrectly placing the dot, establishes his visual acuity with both eyes as normally used.

Figures 4, 5, 6:
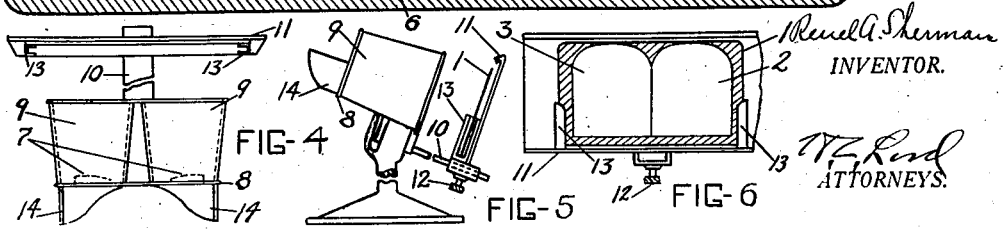
Fig. 4 shows a plan view of a stereoscope.
Fig. 5 shows a side elevation of the same.
Fig. 6 shows an elevation of one of the slides as viewed through the stereoscope.

The views are used in an ordinary stereoscope, as shown in Figs. 4, 5 and 6, these stereoscopes having lenses 7 mounted in a lens-carrying plate 8. Barrels 9 project from the lens-carrying plate. A slide 10 extends forwardly from the barrels and supports a view carrier 11. The view carrier may be adjusted on the slide 10 by a screw 12. The carrier has mounting slots 13 for receiving the views and visors 14 are provided at the lens ends of the barrels.

Figure 2:
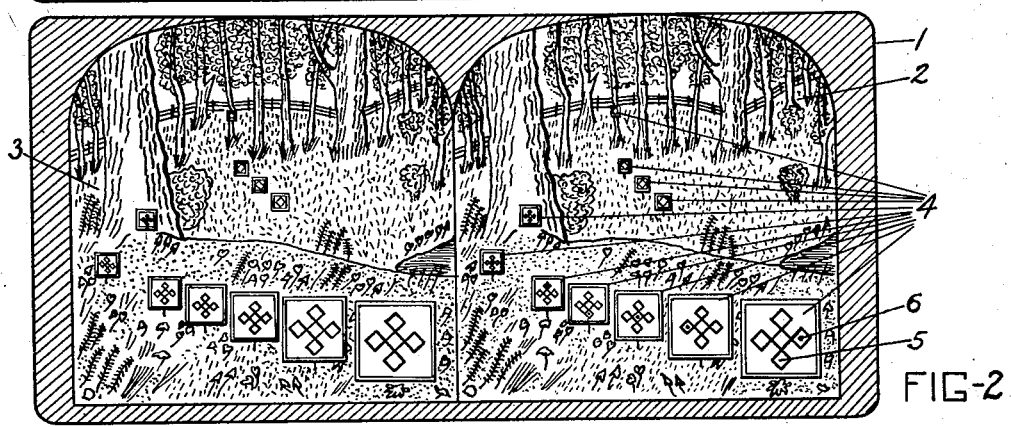
Fig. 2 shows a similar view, with a modification of one of the fields.

In Fig. 2 the targets in the left field are blanks, while the targets in the right field have the dots as placed in the targets in Fig. 1. The person being tested has the targets presented to both eyes, but the dots are presented to his right eye only, and consequently it is possible to obtain the correct visual acuity of the right eye alone, and this visual acuity of the right eye is obtained with the left eye operating in its normal manner. The usual test as practiced by ophthalmologists requires the occlusion of one eye as the other eye is being tested. This method establishes the fact that a more accurate measure of normal visual acuity of an individual eye can be obtained with both eyes seeing in the normal manner, but with the test data presented to but one eye.

Figure 3:
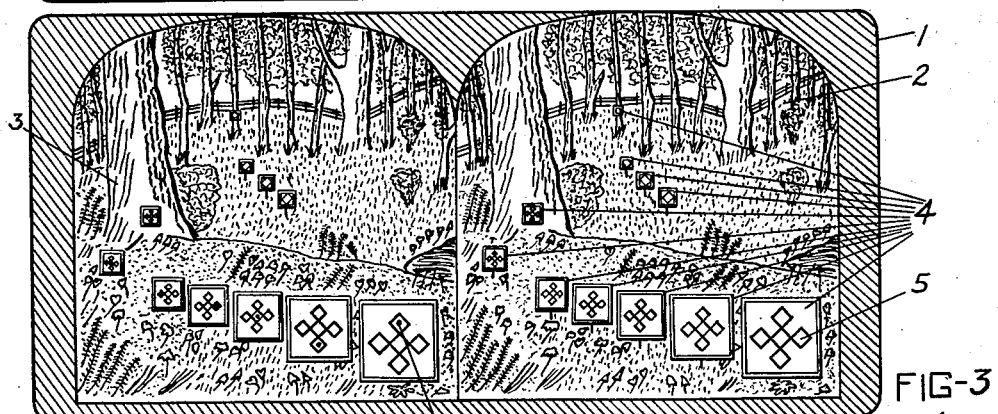
Fig. 3 is a view similar to Fig. 1, presenting a modification of one of the fields, the modified fields in Figs. 2 and 3 being in reverse relation.

In Fig. 3 the targets in the right field are left blank, while the targets in the left field are provided with dots shifted from target to target as the size of the targets vary, and preferably the dots as arranged in the views in Fig. 3 are shifted from the position of the dots in the right field shown in Fig. 2 so that the person being tested has no check as to the sequence of the dots with reference to his test of the right eye.

The ophthalmologist in making the test can, with these views, by shifting one to the other, get quite a definite response from the person being tested, and this is true even though the person being tested is a young child or an illiterate person who may not be able to describe the different symbols such as letters presented in the ordinary tests, because it is only necessary for the person being tested to indicate as each target is presented, which square contains the dot. This can be indicated by merely pointing or by simple description so that the ophthalmologist is very sure to get a correct check from the response of the person being tested. It also assures not only a normal test of visual acuity where both eyes are cooperating in the result, but also a test of each individual eye operating under normal conditions with both eyes seeing.

This method and apparatus also makes it possible to carry on the test under all kinds of conditions as in comparatively small rooms where space would make the ordinary methods impossible, and it provides a simple, compact apparatus that can be readily transported for use so that a single apparatus can be readily used in various locations, as, for instance, where it is desired to conduct tests of pupils in different places, such as schools, and workmen in shops, where mass tests may be desirable.

What I claim as new is:

1. A stereoscopic view having thereon a series of test characters varying in size in a definite stepped size relation, each character having a size of pre-established acuity value, the sizes having a range including test characters perceptible and test characters imperceptible to an average eye.

2. A stereoscopic photographically formed view having test characters varying in size in a definite stepped size relation corresponding to visual image sizes of equal sized object characters at definite stepped distances, each character having a size of pre-established acuity value, the sizes having a range including test characters perceptible and test characters imperceptible to an average eye.

3. A stereoscopic view having thereon test characters varying in size in a definite stepped size relation, each character having a size of pre-established acuity value, the sizes having a range including test characters perceptible and test characters imperceptible to an average eye.

4. A stereoscopic photographically formed view having test characters varying in size in a definite stepped size relation, each character being located in a target and differently located in different targets corresponding to visual image sizes of equal sized object characters at definite stepped distances, each character having a size of pre-established acuity value, the sizes having a range including test characters perceptible and test characters imperceptible to an average eye.

5. A stereoscopic view having thereon test characters varying in size in a definite stepped size relation, each character having a size of pre-established acuity value, the sizes having a range including test characters perceptible and test characters imperceptible to an average eye, the targets being of similar form.

REUEL A. SHERMAN.